Z. RIDDLE.
INCUBATOR.
APPLICATION FILED MAR. 10, 1919.
1,330,721.
Patented Feb. 10, 1920.
8 SHEETS—SHEET 2.
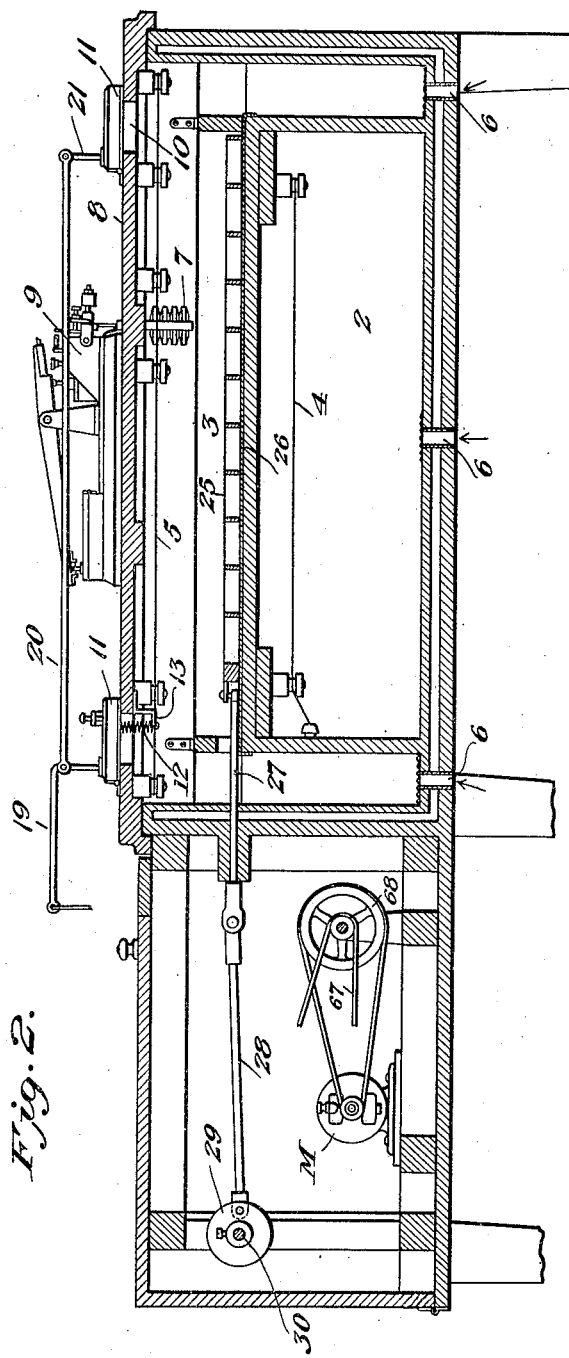
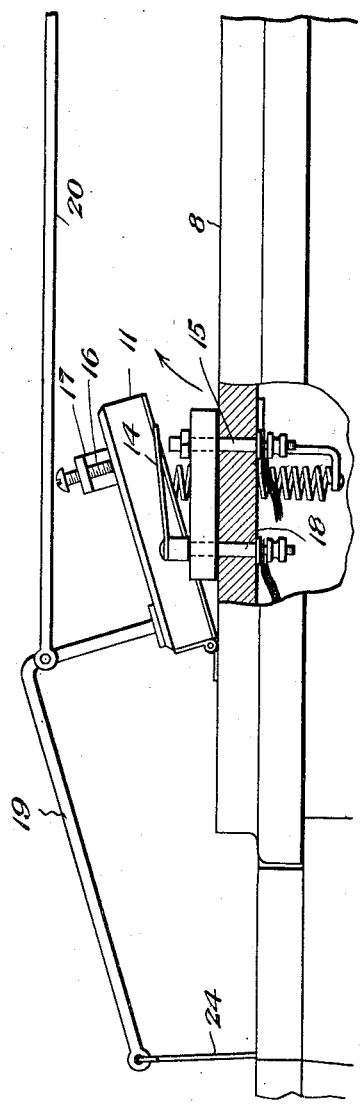
INVENTOR.
Zala Riddle
BY
Victor J. Evans ATTORNEY.

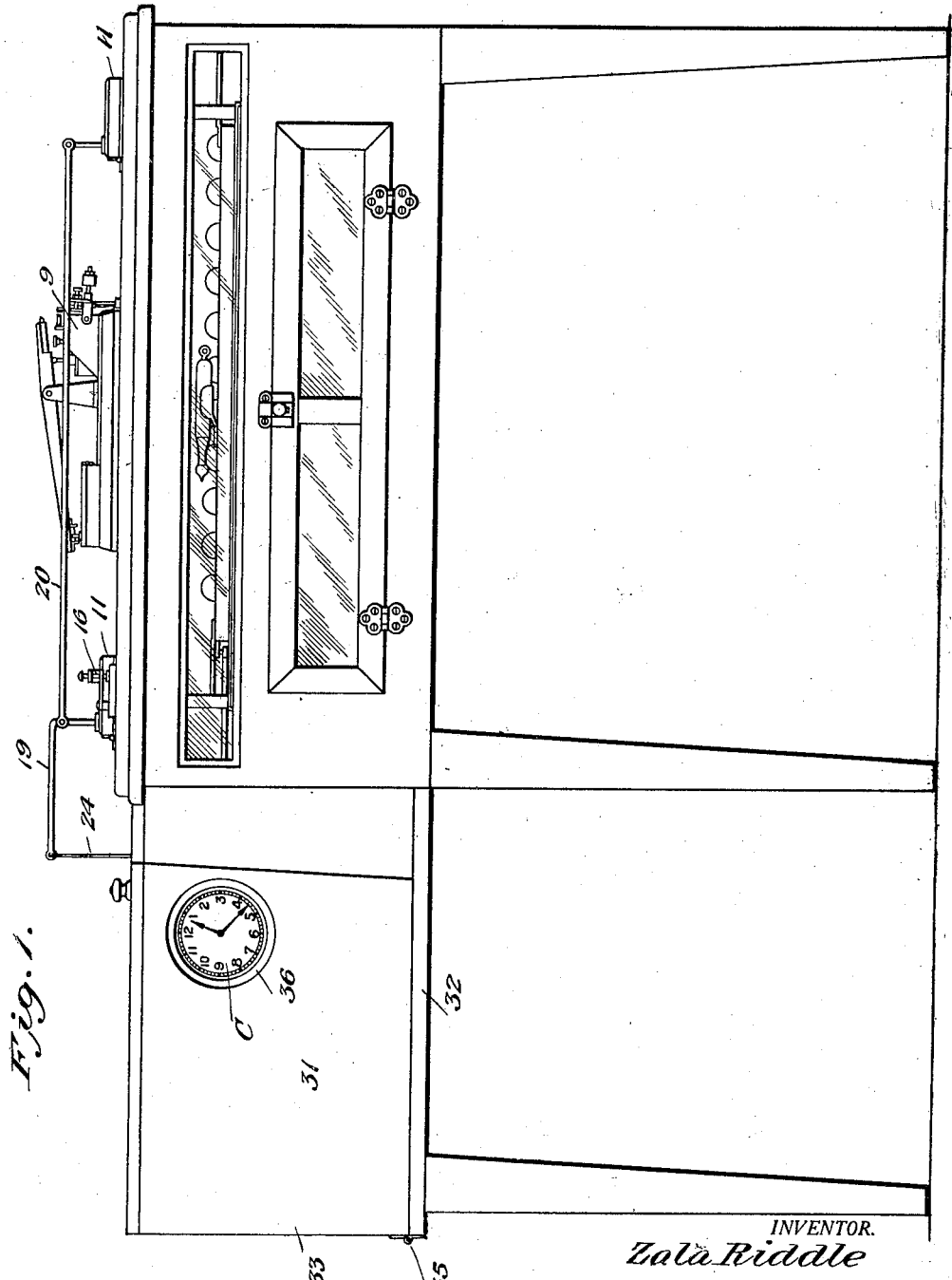

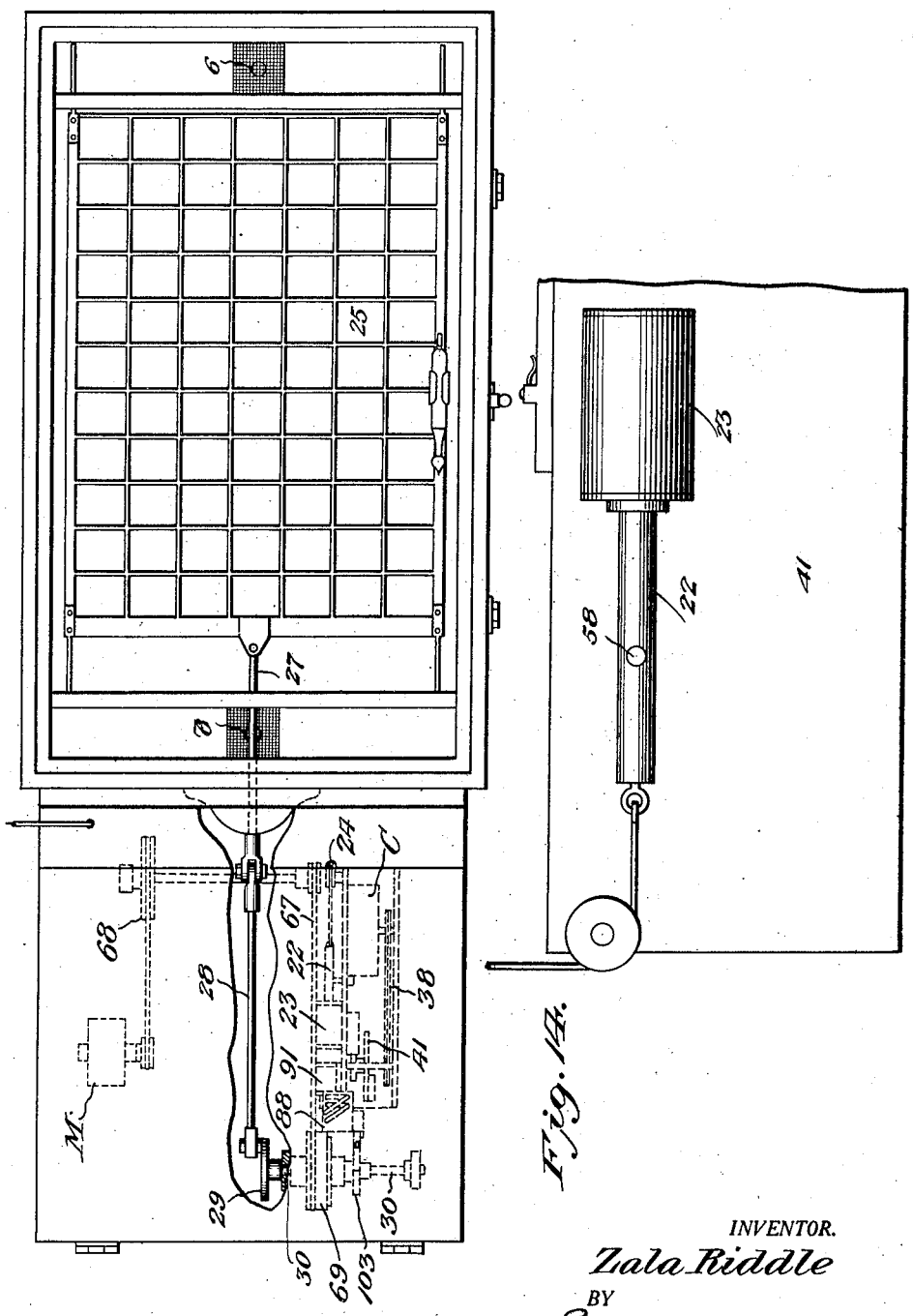

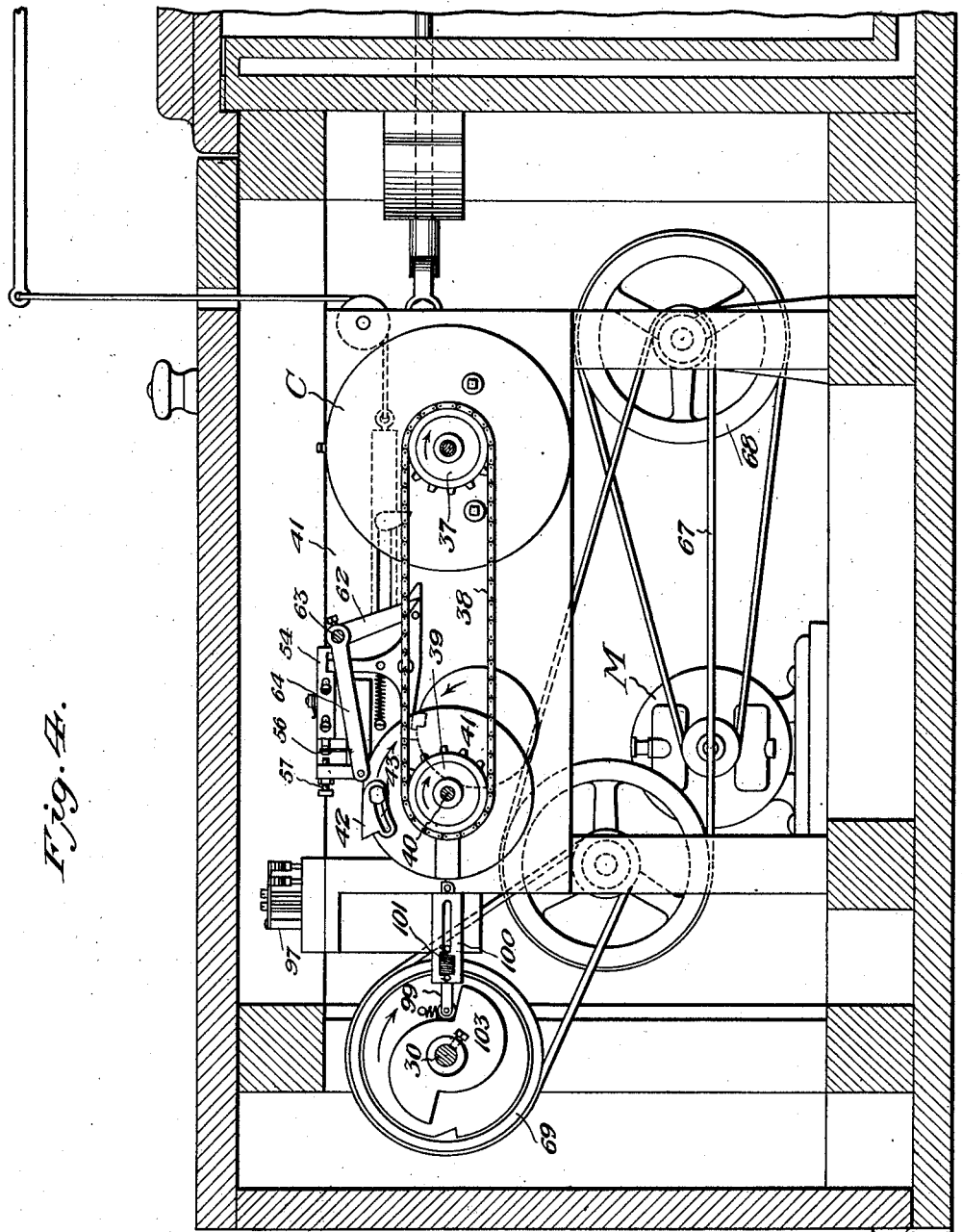

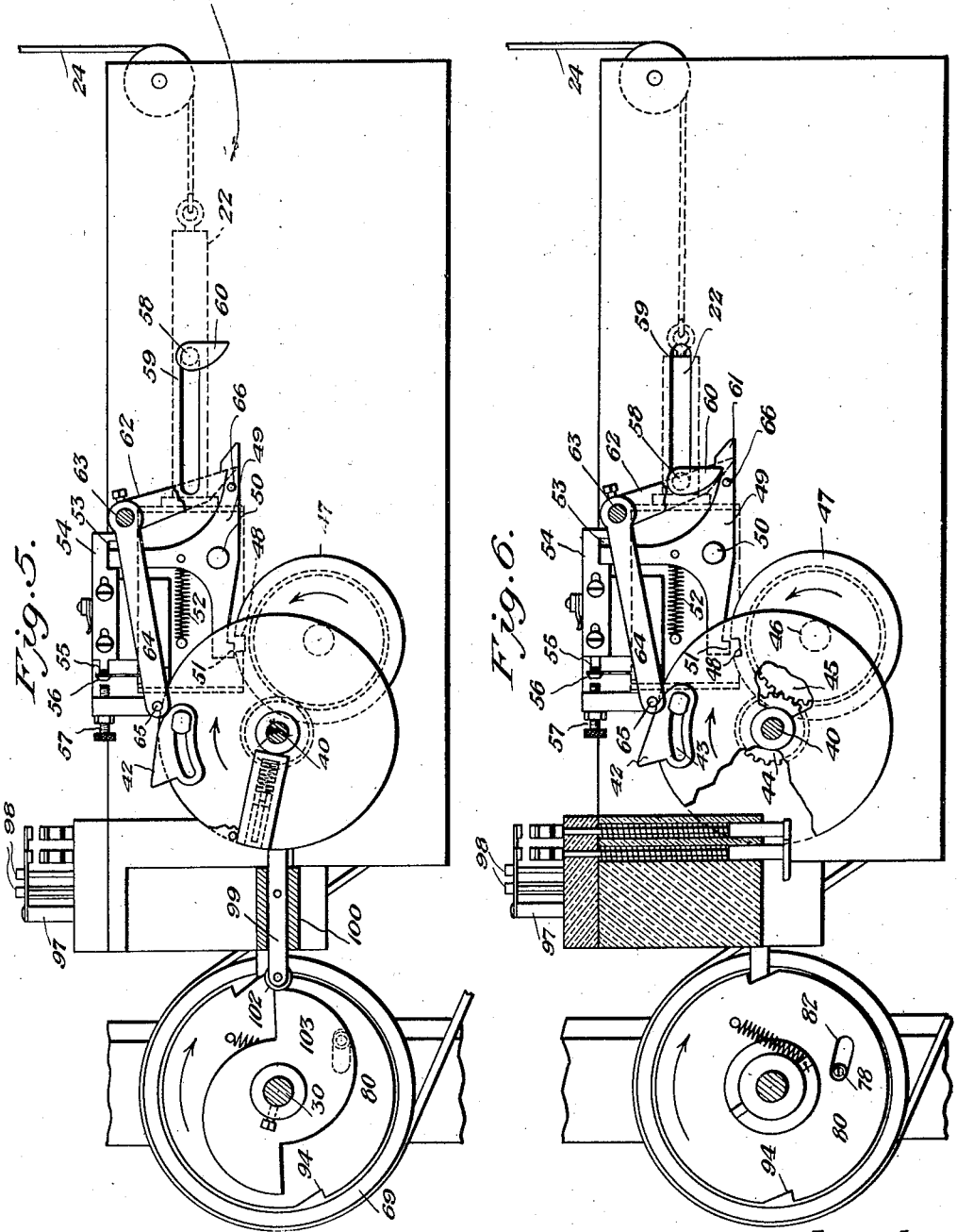

Z. RIDDLE.
INCUBATOR.
APPLICATION FILED MAR. 10, 1919.
1,330,721.
Patented Feb. 10, 1920.
8 SHEETS—SHEET 6.
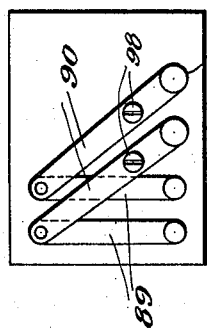
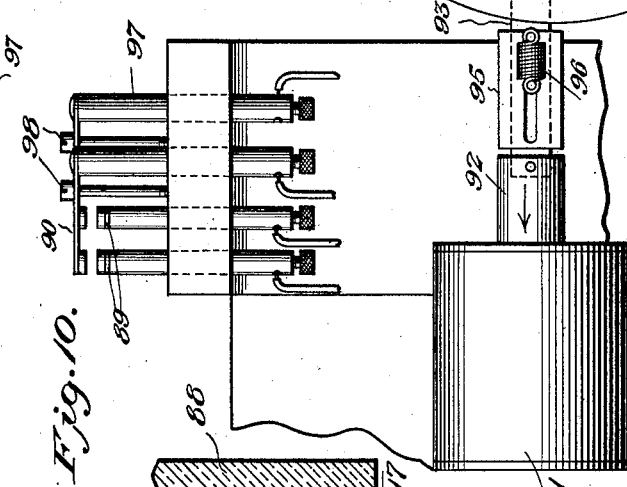
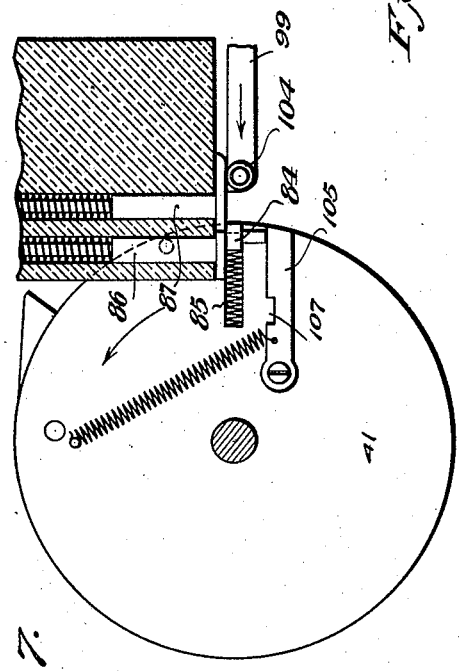
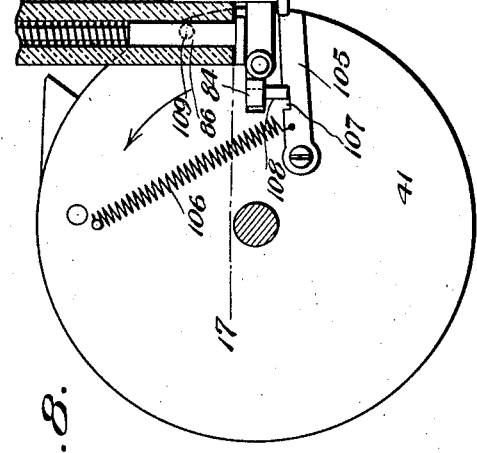
INVENTOR.
Zala Riddle
BY
Victor J. Evans
ATTORNEY.

Z. RIDDLE.
INCUBATOR.
APPLICATION FILED MAR. 10, 1919.
1,330,721.
Patented Feb. 10, 1920.
8 SHEETS—SHEET 7.
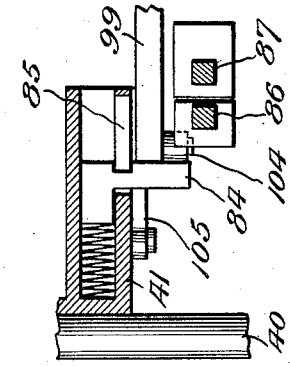
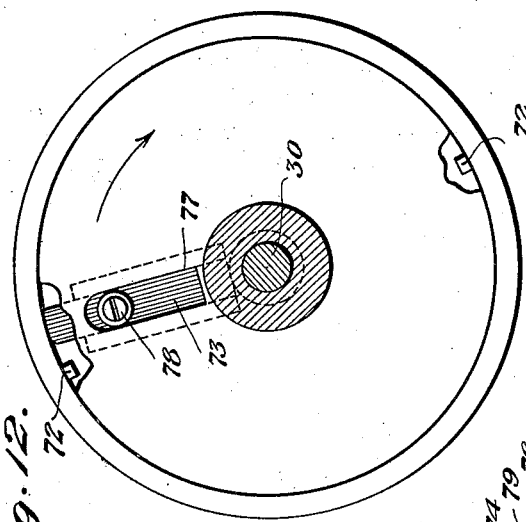
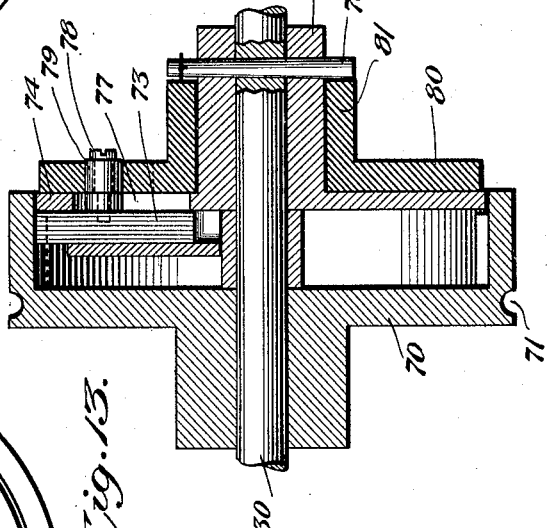
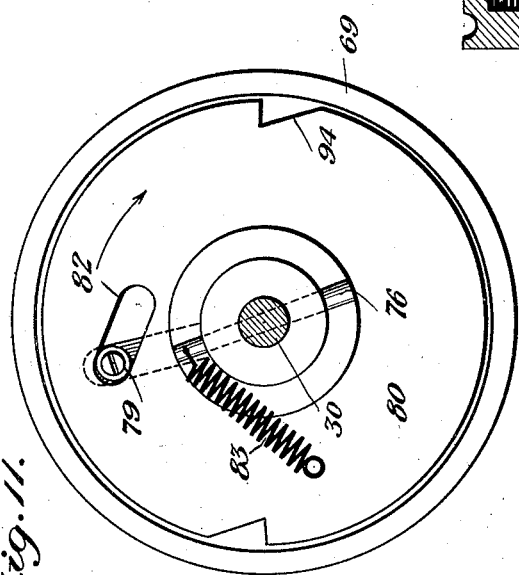
INVENTOR.
Zala Riddle
BY
Victor J. Evans ATTORNEY.

UNITED STATES PATENT OFFICE.

ZALA RIDDLE, OF DUNSMUIR, CALIFORNIA.

INCUBATOR.

1,330,721. Specification of Letters Patent. Patented Feb. 10, 1920.

Application filed March 10, 1919. Serial No. 281,683.

*To all whom it may concern:*

Be it known that I, ZALA RIDDLE, a citizen of the United States, residing at Dunsmuir, in the county of Siskiyou and State of California, have invented new and useful Improvements in Incubators, of which the following is a specification.

This invention relates to improvements in incubators and the principal object of the invention is to provide clock-controlled means for turning the eggs and for shutting off the heat and actuating the ventilating means at pre-determined periods of time.

Another object of the invention is to provide a motor for actuating the egg-turning means with adjustable means for starting and stopping the same by the said clock-actuated means.

Still another object of the invention is to provide a solenoid for lifting the ventilators with adjustable means for controlling the circuit thereto by the said clock-actuated means.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a front view of the incubator and the case containing the actuating means;

Fig. 2 is a longitudinal section through the incubator and case;

Fig. 3 is a plan view with the top of the incubator removed and part of the case broken away;

Fig. 4 is a front view of the operating mechanism with the case in section;

Fig. 5 is an enlarged front view of the means for actuating the ventilators;

Fig. 6 is a like view, partly in section, showing the parts in different positions;

Figs. 7 and 8 are detailed views showing means for actuating the contact plungers;

Fig. 9 is a plan view of the contact springs;

Fig. 10 is a fragmentary view looking toward the rear side of Fig. 5 and showing the contacts and the posts and the solenoid for controlling the clutch;

Figs. 11, 12 and 13 are detailed views of the clutch mechanism;

Fig. 14 is a rear view of the supporting plate and showing the solenoid for actuating the ventilators;

Fig. 15 is a front view partly in section, showing one of the ventilators and the means for controlling the heating circuit thereby;

Fig. 17 is a section on line 17—17 of Fig. 8.

Figure 16:
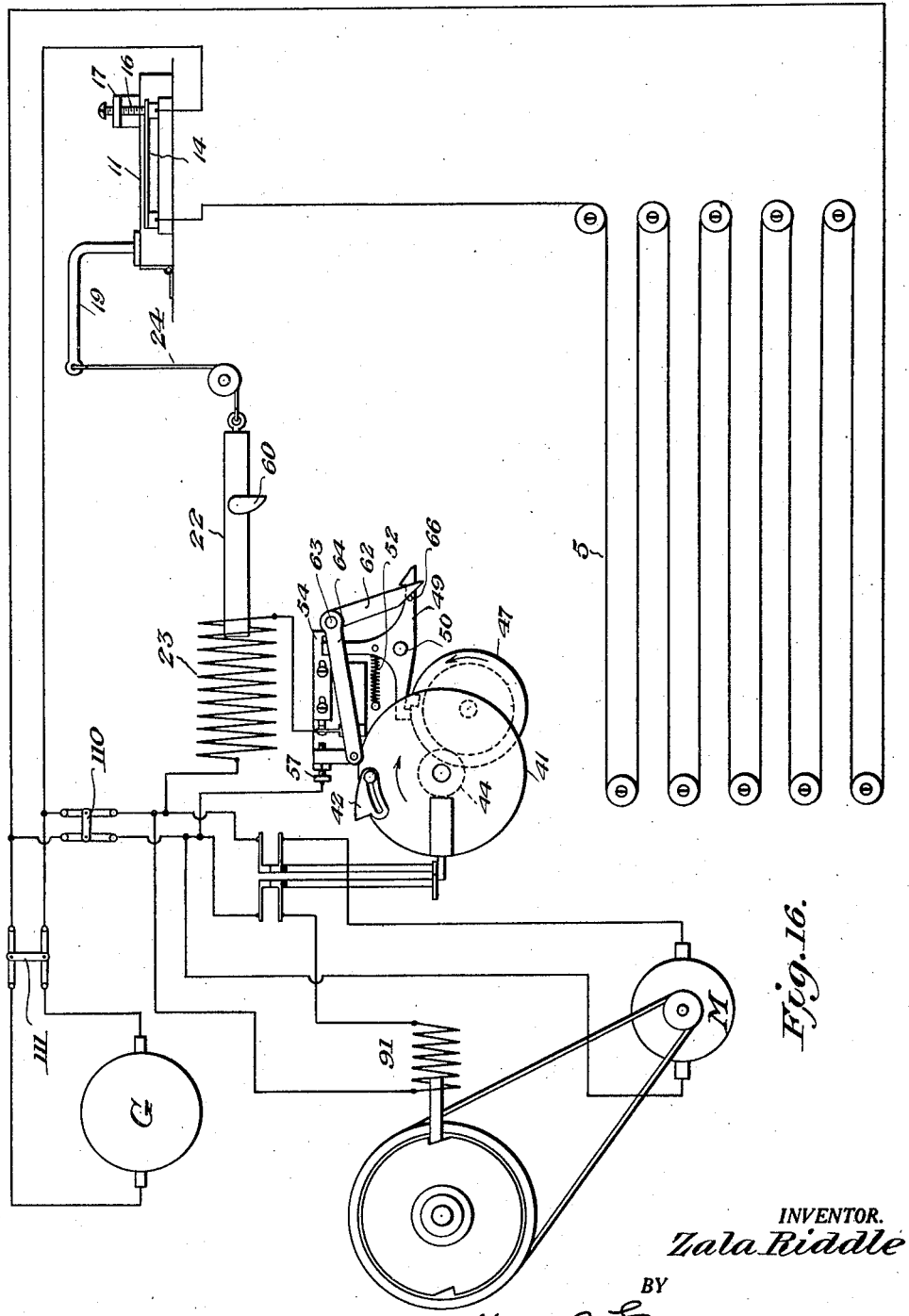
Fig. 16 is a diagrammatic view of the circuits.

In these views 1 indicates the incubator which may be constructed in any desired manner and comprises the brooder chamber 2 and the egg chamber 3. The brooder chamber is provided with the heating coils 4 while the egg chamber is provided with the heating coils 5. The bottom of the incubator is provided with the air inlet openings 6. Within the egg chamber is located the thermostat 7 which is secured to the top 8 of the incubator and this thermostat is connected with the heat regulating means, shown generally at 9. As this regulator forms the subject matter of another application for United States Letters Patent, it will not be described further. The top 8 is provided with the openings 10 which are normally closed by means of the doors 11. These doors are hinged at one edge to the top and one of said doors has a spring 12 secured to its under face and engaging a bracket 13 for yieldingly holding the door in closed position. This door is arranged to make or break the circuit to the heating coils 5 by means of the spring contact 14 held in contact with the post 15, which is connected with a source of current such as the generator G, when the door is in closed position, by means of an adjusting screw 16 carried by the bracket 17 on the door. The post 18 to which the spring contact 14 is secured is connected with the heating coils 5. An L-shaped rod 19 is secured to the spring-controlled door and a rod 20 connects this rod with an upright 21 on the other door so that the two doors will move in unison. The L-shaped rod 19 is connected with the core 22 of a solenoid 23 by the cable 24 so that when the solenoid is energized the doors will be raised and the circuit to the heating coils broken so as to cool the egg chamber of the incubator. The means for energizing the solenoid will be described hereinafter.

Within the egg chamber is a frame 25 which is formed of a plurality of compartments, each compartment receiving an egg. This frame rests on a strip 26 of velvet or the like which is placed on the bottom of the egg chamber. The frame is bottomless so that the eggs will rest on said strip and when the frame is reciprocated the eggs will be caused to roll. As this arrangement of parts forms the subject matter of a separate application for Letters Patent of the United States, it will not be described further. The rod 27 which is connected with said frame and passes through one end of the incubator is connected with a link 28 at its outer end and this link is eccentrically connected with a disk 29 located on a shaft 30, said shaft being rotated by means hereinafter described so as to move the frame and thus turn the eggs.

A case 31 is connected with one end of the incubator and this case incloses the mechanism before referred to. This case consists of a base 32 on which the standards and uprights which support the various parts of the mechanism are located and the inclosing portion 33 which is hinged to the base at one end at 35. One side of this inclosing portion is provided with an opening 36 through which the clock C appears and through which the clock mechanism may be wound.

The hour hand arbor of the clock has secured thereto a chain wheel 37 which is engaged by an endless chain 38. This chain also engages with the chain wheel 39 located on a shaft 40 which has its ends mounted in a pair of supporting plates 41, only one of which is shown. These supporting plates are vertically arranged and are supported by some of the uprights in the case. These plates also support the clock mechanism. The shaft 40 also carries a cam wheel 41 on which is located the cam 42 and this cam is detachably and adjustably connected with the wheel by means of the slot and bolt 43. The shaft 40 also carries a gear wheel 44 which meshes with a second gear wheel 45 carried by a stud shaft 46. This shaft 46 carries a wheel 47 which is provided with a peripheral notch 48. A three-armed lever 49 is pivoted to the rear plate 41 as at 50 and one arm of said lever has a lug 51 thereon which is adapted to engage the notch 48 when the notch is in register with said lug. A spring 52 connected with the upright arm of said lever, tends to force said lug into engagement with the notch. This upright arm of the lever engages in a notch 53 formed in a sliding block 54 which is carried by the rear plate 41 so that when the lever is moved about its pivot said upright arm will cause the block to move longitudinally. This block is provided with a projection 55 which is adapted to engage a spring contact 56 to force the same against the screw terminal 57. This terminal is connected with the generator, as shown in Fig. 16, while the spring contact is connected with the solenoid 23, said solenoid being connected with the generator. As shown in Fig. 14, the solenoid is carried by the rear face of the rear plate 41 and as soon as the circuit is completed to said solenoid by the movement of the sliding block, the core 22 thereof will be drawn inwardly to raise the ventilating doors. The core is provided with a projecting stud 58 which extends through a slot 59 formed in the plate 41 and this stud carries a dog 60. As this dog reaches the end of its movement, it will engage the latch end 61 of the third arm of the lever, first depressing the same to throw the lug 51 out of the notch 48 and then being engaged by said latch to hold the core of the solenoid in retracted position with the ventilators open. As soon as the dog strikes the latch arm and tilts the lever the sliding block will be returned to normal position and the circuit to the solenoid broken. As before stated, however, the core of this solenoid is held in retracted position by the dog and latch arm. The means for releasing the core consist of an arm 62 secured to a shaft 63 and a second arm 64 secured to said shaft 63 and having a pin 65 on its free end which is adapted to be engaged by the cam 42 to raise said arm 64 and thus rotate the shaft 63 to throw the arm 62 downwardly. This downward movement of the arm 62 will cause its tapered end to engage a pin 66 on the latch arm of the lever to tilt said lever and thus release the dog from the latch to permit the core of the solenoid to return to its normal position under the weight of the doors and the spring 12 connected to one of the doors.

It will thus be seen that the incubator will be cooled at predetermined periods of time according to the sizes of the gears connecting the device with the clock. The length of this cooling period may be regulated by adjusting cam 42 on the cam wheel and as this cam is detachable a cam of a different size may be placed on the wheel. It will also be seen that the electric circuit is broken just as soon as the core of the solenoid reaches a position to cause the dog to engage with the latch so that the ventilating doors are kept open by mechanical means.

The mechanism for rotating the shaft 30 for moving the frame in the egg chamber to roll the eggs, consists of a motor M which is connected to said shaft by means of the belts 67 and the pulleys 68, and also the clutch member 69. The free part 70 of the clutch member is of cup-shape and is loosely mounted on the shaft. This part is provided with an annular groove 71 to receive the belt. The interior walls of this movable member is provided with the projections 72 which are adapted to be engaged by the sliding member 73 slidably attached to the inner face of a circular plate 74. This plate fits in the cupshaped part and is provided with a boss 75 provided with a bore to receive the shaft. The plate is connected with said shaft by means of a pin 76 passing through the boss and the shaft. The plate is also provided with a slot 77 through which extends a pin 78 connected with the sliding member and carrying a roller 79. A second plate 80 is rotatably secured to the boss 75 of the second plate by means of its tubular boss 81 surrounding said boss 75. This plate is provided with an inclined slot 82 with which the outer end of the roller 79 engages. A coiled spring 83 has one end attached to the rotatable plate and its other end to one end of the pin 76. This spring tends to hold the plate 80 in a position with the roller at the outer end of the slot so as to force the sliding member outwardly into engagement with the inner periphery of the movable part of the clutch so as to be engaged by the lugs or projections 72. When this engagement takes place the parts of the clutch will be caused to revolve together and thus the shaft 30 will be rotated by the motor.

The means for completing the circuit to the motor by the clock mechanism comprises a spring-controlled dog 84 projecting from the rear face of the wheel 41 and working in a slot 85 therein. This dog will contact with the enlarged ends of a pair of contact plungers 86 and 87 which are mounted in the insulated block 88 suitably supported by the rear supporting plate. These plungers when raised, will force the spring contacts 89 against the spring contacts 90 and thus complete the circuit from the generator to the motor and also the circuit from the generator to a solenoid 91 which is supported by the rear supporting plate and the core 92 of which is provided with an extension 93 having a beveled end which is adapted to engage with notches 94 formed in the edges of the movable plate 80 of the clutch member thus holding said movable plate stationary. The extension is held by a guide sleeve 95 and a spring 96 tends to hold the extension in its projected position with its end engaging one of the notches in the movable plate. It will be seen that as soon as the circuit to the solenoid is completed, the extension will be withdrawn from said notch so as to permit the clutch member to rotate. The contact springs 89 and 90 are carried by the posts 97 with the free ends of the springs 90 located above the free ends of the springs 89 and these free ends are placed above the upper ends of the plungers. Upward movement of the upper springs 90 is prevented by the screws 98. As the egg frame is to be moved from one end of the egg chamber to the other, the shaft 30 need only move a half of a revolution and the means for stopping this shaft consist of a push rod 99 slidably mounted in a guide 100 and held in its retracted position by a spring 101. This push rod carries a roller 102 which is held in engagement by said spring with a cam 103 located on the shaft 30. This cam is so formed as to project the rod on each half revolution of the shaft. The free end of the push rod carries a roller 104 which will engage with the dog 84 to push the same inwardly so as to free the contact plungers and to permit the springs of these plungers to return them to their lower position. The dog 84 is held in its inner position by a latch bar 105 pivoted to the wheel 41 and having a spring 106 connecting said bar to said wheel. This bar is provided with a notch 107 which will engage a depending part 108 on the dog when the said dog is in its inner position. As the wheel 41 rotates, the latch bar 105 will strike a pin 109 on the block 88 so as to depress said latch bar and thus free the dog 84 so that the same will return to its normal position adjacent the edge of the wheel so as to be ready to engage the plungers on the next revolution of the wheel. It will be seen that the dog 84 will engage both of the plunger rods to raise the same simultaneously, but as the push rod forces the dog inwardly the plunger 87 will be released first so that said plunger will drop and thus break the circuit to the solenoid 91 to permit the core thereof to assume its normal position against the edge of the plate 80 ready to engage one of the notches therein when the same comes opposite the beveled end of the extension 93. When the push rod reaches the end of its movement it will be in engagement with the plunger 86 so as to hold the same in raised position and then when the push rod starts its return movement it will pass over said plunger to permit the same to fall and the roller on said push rod will pass above the enlarged end of the plunger 87, as shown in Fig. 8. When the plunger rod 86 drops the circuit to the motor will be broken. As soon as the plate 80 of the clutch member is halted in its movement by the core of the solenoid engaging one of the notches in said plate, the momentum of the parts attached to the shaft 30 will cause the roller 79 to travel inwardly along the slot 82 in the plate 80 and thus the sliding member 73 will be moved inwardly and out of contact with the projections or lugs 72 and thus the movable part 70 of the clutch will be detached from the other parts and from the shaft 30. The spring 83 is strong enough to rotate the plate 80 in the direction of the arrow in Fig. 11 when said plate is freed of the stop carried by the core of the solenoid so that this movement of the plate will force the sliding member outwardly so that it may be engaged by the lug 72. By this arrangement of the parts the movable part 70 of the clutch member will have sufficient movement before being engaged by the sliding member, to permit the motor to pick up before being attached to the load.

It will thus be seen that at predetermined periods, according to the sizes of the gears used, the clock mechanism will rotate the wheel 41 to bring the dog into engagement with the contact plungers to close the circuit to the motor and to the solenoid for releasing the clutch member. Then on the continued rotation of the wheel 41 the circuits to the solenoid will first be broken to release the stop for the clutch member and then the circuit to the motor will be broken. Thus the shaft 30 will be given a half revolution so as to move the egg frame from one end of the egg chamber to the other and thus roll the eggs.

As the cooling means and egg turning means are not used until a few days after the incubator is started, I provide a switch 110 for cutting out the circuits to such means, though the circuit to the heating coils will still be open. I provide a switch 111 for cutting out this heating circuit when the incubator is not in use.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with an incubator having ventilators and egg turning means, of a motor connected with said turning means, a solenoid connected with the ventilators and clock actuated means for controlling the circuits to said motor and solenoid.

2. In combination with an incubator provided with ventilators, electrical means for heating said incubator, means for breaking the circuit to the heating coils when the ventilators are raised, a solenoid having its core connected with said ventilators and clock actuated means for completing the circuit to said solenoid.

3. In combination with an incubator having ventilating means, of a solenoid having its core connected with said means, clock mechanism, an electric circuit including said solenoid, a pair of contacts in said circuit, means actuated by the clock mechanism for closing said contacts, mechanical means associated with the solenoid core and actuated thereby for separating the contacts and for holding the core in its contracted position and means also actuated by the clock mechanism for releasing the core.

4. In combination with an incubator having ventilating means, of a solenoid having its core connected with the said means, clock mechanism, an electric circuit including said solenoid, a pair of contacts in said circuit, means actuated by the clock mechanism for closing said contacts, mechanical means associated with the solenoid core and actuated thereby for separating the contacts and for holding the core in its contracted position and adjustable means also actuated by the clock mechanism for releasing the core.

5. In combination with an incubator having ventilating means, of a solenoid having its core connected with the ventilating means, clock mechanism, a shaft actuated by said mechanism, an electric circuit including said solenoid, a pair of contacts in said circuit, means actuated by the shaft for closing said contacts, mechanical means associated with the solenoid core and actuated thereby for returning the contact closing means to inoperative position and for holding the core in its contracted position, a wheel on the shaft, a cam on said wheel and means operated by the cam for releasing said core.

6. In combination with an incubator having ventilating means, of a solenoid having its core connected with the said means, clock mechanism, a shaft actuated by said mechanism, an electric circuit including said solenoid, contacts in said circuit, a sliding block for closing said contacts, a spring-controlled rocking lever having one arm engaging said block to slide the same, a latch arm formed on said lever and adapted to be engaged by a part of the solenoid core to hold the core in contracted position and to move the block to disengage the contacts, means actuated by the shaft for permitting the rocking lever to move the block into operative position and means associated with said shaft for releasing the core from said latch arm.

7. In combination with an incubator having ventilating means, of a solenoid connected with said means, clock mechanism, a shaft driven from said mechanism, an electric circuit including said solenoid, a pair of contacts in said circuit, a sliding block for closing the contacts, a spring-controlled three-armed lever having one arm engaging said block to move the same to close the circuit, a lug on the other arm and the third arm having a latch thereon, a wheel actuated by the said shaft and having a notch therein into which the lug enters when said notch comes opposite the lug, a projection on the core of the solenoid adapted to strike the latch arm to release the lug from the notch and to return the block to inoperative position, said latch arm engaging said projection to hold the core in contracted position, a wheel on the shaft, an adjustable cam carried by the wheel and means operated by said cam for releasing the core projection from said latch arm.

8. In combination with an incubator having egg turning means therein, of a shaft having a crank thereon, means for connecting the crank with said egg turning means, a clutch member on said shaft, a motor connected with the free part of said clutch member, an electric circuit including said motor, contacts in said circuit, clock mechanism for closing said contacts, locking means for the clutch member, a solenoid having its core forming part of the locking means, a circuit including said solenoid, contacts in said circuit also closed by said clock mechanism and means for breaking said circuits when the shaft has made a half revolution.

9. An incubator having egg turning means therein, a shaft having a crank thereon connected with said means, a clutch member on said shaft, a motor connected with the free part of said clutch member, locking means for the clutch member, a solenoid having its core forming part of the locking means, electric circuits including said motor and solenoid, contacts in said circuits, clock-controlled mechanism for closing said contacts, a cam on the shaft and means operated by the cam for permitting the contacts to separate to break the circuits.

10. An incubator having egg turning means therein, a shaft having a crank thereon, means for connecting said crank with the said means, a clutch member on said shaft, a motor connected with the free part of said clutch member, locking means for the clutch member, a solenoid having its core forming part of the said locking means, electric circuits including said motor and solenoid, spring contacts in said circuits, spring plungers for engaging said contacts, clock mechanism, a rotatable element driven from said clock mechanism, a slidable member carried by the rotatable element, a spring for holding said member in its outer position so as to engage with the plungers during the rotation of said element to raise said plungers to close the contacts, a cam on the shaft and a push rod actuated by the cam for forcing the slidable member inwardly to release the plungers.

11. An incubator having egg turning means therein, a shaft having a crank thereon, means for connecting the crank with the said means, a clutch member on the shaft, a motor connected with the free part of said member, locking means for the clutch member, a solenoid having its core forming part of said locking means, electric circuits including said motor and solenoid, spring contacts in said circuits, plunger rods for closing said contacts, clock mechanism, a rotatable element driven from said clock mechanism, a slidable member in said rotatable element, a spring for holding said member in its outer position so as to strike said plungers to raise the same to close the contacts, a push rod for forcing said member inwardly to release the plungers, a cam on the shaft for actuating said push rod, a latch on the rotatable element for engaging the sliding member to hold the same in its inner position and means for releasing the latch during the rotation of said element.

12. An incubator having egg turning means therein, a shaft connected to said means, a clutch member on said shaft consisting of a cup-shaped member freely mounted on the shaft and having projections on its interior walls, a second member secured to the shaft, a sliding bar carried by said second member and adapted to engage with the projections when in its outer position, a plate rotatably mounted on the second member and having an inclined slot therein engaging with a part on the sliding bar, a spring connecting said plate with the shaft, said plate having notches therein, a motor connected with the freely movable part, a solenoid having a locking bolt carried by the end of its core for engaging said notches, electric circuits including said solenoid and motor, clock-controlled mechanism for closing said circuits, a cam on said shaft and means actuated thereby for breaking said circuits.

In testimony whereof I affix my signature.

ZALA RIDDLE.